Feb. 20, 1968     W. F. MILES     3,369,834
TRANSPLANTER DEVICE
Filed June 8, 1967
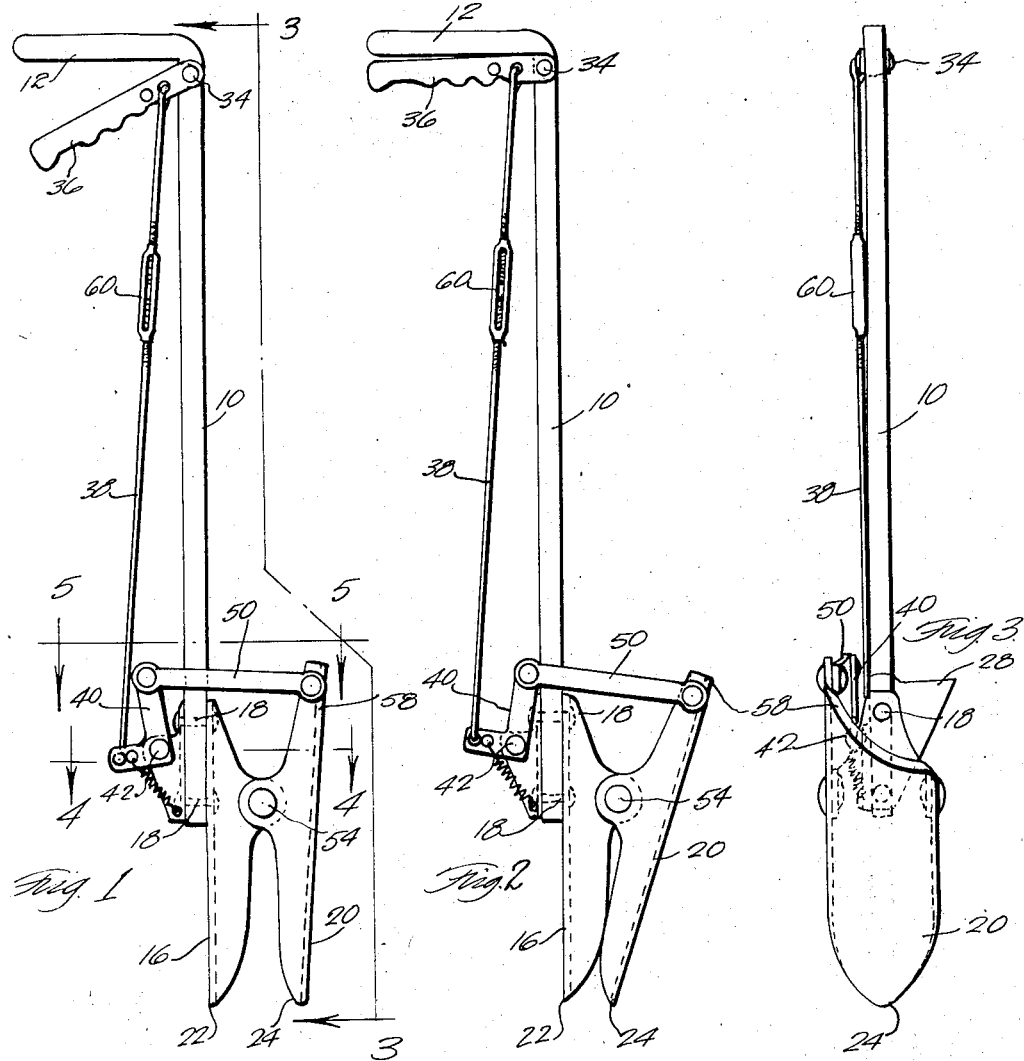
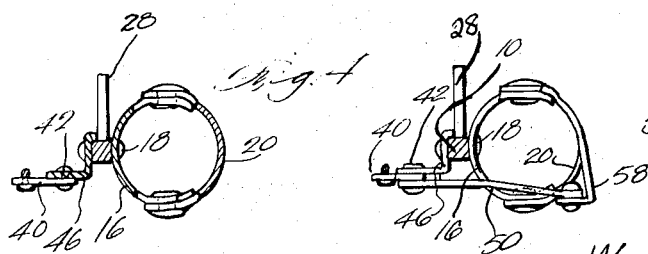
INVENTOR.
WOODROW F. MILES
BY
Victor J. Evans & Co.
ATTORNEYS 3,369,834
TRANSPLANTER DEVICE
Woodrow F. Miles, 3216 Lyles St.,
Columbia, S.C. 29201
Filed June 8, 1967, Ser. No. 644,661
3 Claims. (Cl. 294—50.9)

ABSTRACT OF THE DISCLOSURE

A transplanter device having an extended handle with a handle arm at one end, a semicircular scoop at the other pivotally related to a mating scooper shell, a rocker arm mounted on the back of the fixed scooper shell and being driven by a turnbuckle linkage means attached to a pivoted handle means, and the other end of the rocker arm adapted to operably move the mating scooper shell, and in which there is also provided a fixedly attached foot pedal on the upper free end of the mating scooper shell. A biasing spring is provided to hold the rocker arm in a position in order that the pivoted handle and the scooper shells are in a normally opened position.

---

The present invention relates to an improved transplanter device for cuttings, small plants, and the like, and more particularly the invention relates to an improved transplanter device in which there is a fixed and mating semicircular scooper shell arrangement pivotally connected at a midpoint thereof, and in which the mating scooper shell is operably opened and closed by linkage means from a pivoted handle. Also the invention relates to providing a foot pedal transversely mounted on the free upper end of the mating scooper shell for allowing one to push the transplanter device into the ground with ease where the ground is found to be hard and rocky. Also a biasing spring is provided on the rocker arm to hold the scooper shells and the handle arms in a normally distended or opened position.

An object, therefore, of the present invention is to provide a transplanter device that allows full vision through the opening between the mating semicircular scooper shells, as well as for allowing the plant to extend fully upward through the shells without interference with the linkages, mechanical details and connections thereof, to the rocker arm and pivotal handle arm thereof.

The above and other objects and advantages of the invention will become apparent upon full consideration of the following detailed description and accompanying drawings in which:

FIGURE 1 is a side elevation view showing the transplanter device of the present invention in its normally opened position;

FIGURE 2 is similar to FIGURE 1, but showing the transplanter device in its closed position;

FIGURE 3 is a sectional view taken along line 3—3;

FIGURE 4 is a cross-sectional view taken along line 4—4 of FIGURE 1; and

FIGURE 5 is a cross-sectional view taken along line 5—5 of FIGURE 1.

Referring now to the drawings, there is shown an extended handle 10, having at the upper end a fixed handle arm 12 and terminating at the lower extremity of the handle 10 in a fixed semicircular scooper shell 16 which is attached thereto by rivets 18. There is a mating semicircular scooper shell 20 which is centrally pivoted to the fixed semicircular scooper 16, and both of the scooper shells 16, 20 have tapered, shovel-like ends 22, 24.

The upper free end of the scooper shell 16 is disposed to have fixedly attached thereto a foot pedal means 28 for extending the scooper shell into hard or rocky soil or ground.

Pivotally connected by means 34 at the upper end of the extended handle 10 is a movable handle arm 36 to which there is connected a linkage and turnbuckle 38 which has its lower end connected to a free end of an L-shaped lever or rocker arm 40, which is pivotally mounted by pivot means 42 at the back end of the fixed scooper shell 16. The pivotal mounting 42 includes a bracket or angle mounting means 46. The other free end of the rocker arm 40 is connected by a further linkage 50 to the upper free end of the mating scooper shell 20 and it is seen that as the handle 36 is moved upwardly, the scooper shell 20 is pivoted clockwise, as viewed in FIGURES 1 and 2.

The mating shells 16, 20 are connected by pivot means 54. The linkage means 50 is connected to a nonsymmetrical upper extension of the mating shell 20 as is viewed by the extension portion 58 in each of FIGURES 1, 2, 3 and 5. The turnbuckle 60 and the linkage means 38 may be adjusted to control the amount of movement of the handle 36 with respect to the opening of shell 20 with respect to shell 16.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:
1. A transplanter device comprising an extended handle terminating at upper end in a handle arm and at the lower end in a fixed semicircular scooper shell, a mating semicircular scooper shell centrally pivoted to the fixed semicircular scooper shell, a pivotally mounted rocker arm mounted on the back of the fixed scooper shell, a pivotally mounted handle arm mounted on said handle, a linkage and turnbuckle means between said pivoted handle and an end of said rocker arm, a further linkage between the other end of the rocker arm and an upper free end of the mating scooper shell.

2. A transplanter device as claimed in claim 1 wherein a foot pedal is mounted on the upper free end of the fixed scooper shell.

3. A transplanter device as claimed in claim 1 wherein adjustment means is provided to control the extended movements of the movable handle and the mating shell.

References Cited

UNITED STATES PATENTS

| | | | |
|---|---|---|---|
| 1,860,963 | 5/1932 | Smith | 294—50.9 X |
| 2,759,758 | 8/1956 | Yancey | 294—104 |

FOREIGN PATENTS

| | | |
|---|---|---|
| 150,844 | 9/1920 | Great Britain. |

RICHARD E. AEGERTER, Primary Examiner.
R. D. GUIOD, Assistant Examiner.